United States Patent
Macaulay et al.

(10) Patent No.: US 10,111,555 B2
(45) Date of Patent: Oct. 30, 2018

(54) BEVERAGE COMPOSITION

(75) Inventors: Claire Elizabeth Macaulay, Witney (GB); Sandra Heraud, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 13/510,646

(22) PCT Filed: Nov. 22, 2010

(86) PCT No.: PCT/US2010/057596
§ 371 (c)(1),
(2), (4) Date: Aug. 30, 2012

(87) PCT Pub. No.: WO2011/063322
PCT Pub. Date: May 26, 2011

(65) Prior Publication Data
US 2012/0321755 A1    Dec. 20, 2012

(30) Foreign Application Priority Data
Nov. 23, 2009   (GB) .................................... 0920500.6

(51) Int. Cl.
A23L 2/00       (2006.01)
A23L 2/52       (2006.01)
(Continued)

(52) U.S. Cl.
CPC .............. A47J 31/41 (2013.01); A23G 1/56 (2013.01); A23P 10/20 (2016.08); A23P 30/40 (2016.08)

(58) Field of Classification Search
CPC ........ A23G 1/56; A23G 3/54; A23V 2002/00; A23L 2/00; A47J 31/3623
(Continued)

(56) References Cited

U.S. PATENT DOCUMENTS 4,438,147 A *   3/1984   Hedrick, Jr. .................. 426/570
4,736,527 A     4/1988   Iwamoto et al.
(Continued)

FOREIGN PATENT DOCUMENTS

DE      44 07 361 A1   9/1995
DE      695 19 103 T2  5/2001
(Continued)

OTHER PUBLICATIONS

Lapp.com/Our_Foods.html, Cacao, Food of the gods, (Sep. 2013).*
(Continued)

*Primary Examiner* — Erik Kashnikow
*Assistant Examiner* — Lela S. Williams
(74) *Attorney, Agent, or Firm* — Fitch, Even, Tabin & Flannery, LLP

(57) ABSTRACT

A chocolate beverage composition is provided having a white, non-discolored foam on its surface. The chocolate beverage composition includes a foaming creamer and discrete, substantially non-powdered cocoa solids. The composition may be suitable for forming a beverage on the addition of a hot or cold liquid. The composition may also include a sweetening agent, a flavoring agent, a thickener, or a whitener. A beverage dispensing container of the beverage composition is also provided and may be in the form of a cartridge, sachet, pod or capsule and may be used with a beverage dispensing machine. Methods of forming the beverage composition are also provided.

20 Claims, 2 Drawing Sheets

(51) Int. Cl.
*A47J 31/41* (2006.01)
*A23G 1/56* (2006.01)
*A23P 10/20* (2016.01)
*A23P 30/40* (2016.01)

(58) Field of Classification Search
USPC ....... 426/631, 115, 569, 425, 431, 429, 593, 426/584, 232
See application file for complete search history.

(56) References Cited

U.S. PATENT DOCUMENTS

| | | | |
|---|---|---|---|
| 4,798,040 A | 1/1989 | Haas et al. | |
| 5,433,962 A | 7/1995 | Stipp | |
| 5,721,003 A | 2/1998 | Zeller | |
| 5,780,092 A | 7/1998 | Agbo et al. | |
| 5,882,716 A | 3/1999 | Munz-Schaerer et al. | |
| 6,174,557 B1 | 1/2001 | Gamez-Rumpf et al. | |
| 2003/0219522 A1 | 11/2003 | Wragg et al. | |
| 2004/0146625 A1* | 7/2004 | Zumbe | 426/593 |
| 2011/0229624 A1* | 9/2011 | Troplin et al. | 426/631 |

FOREIGN PATENT DOCUMENTS

| | | |
|---|---|---|
| DE | 698 10 600 T2 | 11/2003 |
| DE | 602 20 992 T2 | 3/2008 |
| EP | 0 579 328 A1 | 1/1994 |
| WO | 96/34535 A1 | 11/1996 |
| WO | 98/06274 A1 | 2/1998 |
| WO | 98/14069 A1 | 4/1998 |
| WO | 98/34495 A1 | 8/1998 |
| WO | 01/21292 A1 | 3/2001 |
| WO | 02/074143 A2 | 9/2002 |
| WO | 2004/095937 A1 | 11/2004 |
| WO | 2006/058713 A1 | 6/2006 |
| WO | 2008/052952 A1 | 5/2008 |
| WO | 2008/129053 A1 | 10/2008 |
| WO | 2009/024200 A1 | 2/2009 |

OTHER PUBLICATIONS http://www.toblerone.co.uk/products/toblerone-milk/toblerone-milk-chocolate?c1=1834&c2=1847&p=3057 (Sep. 2013).*
http://www.food.gov.uk/multimedia/pdfs/chocguidancejun2009.pdf (Aug. 2009).*
United Kingdom Intellectual Property Office Search Report for United Kingdom Application No. GB0920500.6 dated Mar. 4, 2010 (2 pages).
European Patent Office International Search Report for International Application No. PCT/US2010/057596 dated Feb. 4, 2011 (3 pages).
Erik Fooladi, Chocolate part 3:3—making your own instant cocoa, Fooducation.org, May 26, 2009, http://www.fooducation.org/2009/03/chocolate-part-3-making-your-ow . . . , retrieved on Apr. 27, 2015, 2 pages.
Wikipedia, Cocoa Solids, http://en.wikipedia.org./wiki/Cocoa_solids, retrieved on Apr. 27, 2015, 4 pages.
Notice of Opposition to European Patent EP 2 503 900 B1 filed on Apr. 30, 2015 by Krueger GmbH & Co. KG, 13 pages.
Informal English Translation of the Notice of Opposition to European Patent EP 2 503 900 B1 filed on Apr. 30, 2015 by Krueger GmbH & Co. KG, 13 pages.

* cited by examiner

BEVERAGE COMPOSITION

CROSS-REFERENCE TO RELATED APPLICATIONS

This application is a U.S. national phase application filed under 35 U.S.C. § 371 of International Application PCT/US2010/057596, filed on Nov. 22, 2010, designating the United States, which claims priority from GB 0920500.6, filed on Nov. 23, 2009, which is hereby incorporated herein by reference in its entirety.

FIELD

The present disclosure relates to a beverage composition and more particularly to a chocolate beverage composition which can be used to prepare a beverage having a white foam on its surface. The compositions according to the present disclosure are suitable for forming a beverage on the addition of a hot or cold liquid.

BACKGROUND

When consumers buy foamed beverages at coffee shops and restaurants, the beverage is commonly made from a concentrated flavoured liquor, such as an espresso shot. Separately an amount of milk is foamed using a source of steam in order to obtain a hot foamed milk. In preparing the beverage, the liquor is placed in a cup or mug and the hot foamed milk is added. Care is typically taken to retain the frothiest portion of the milk till last so that a white uppermost foam layer can be produced on the beverage which has the greatest possible foam size.

It is known that consumers also appreciate the convenience of being able to make the same foamed beverages at home or in the work place where it is not possible to have a source of steam-prepared hot foamed milk. In this way, foaming creamers have been developed and are known for use in preparing foamed beverages at the consumers' convenience. However, when preparing instant beverages the creamer is typically mixed with the flavouring component, either in the instant preparation or in the already diluted beverage. In this way the foam that is provided on top of the beverage adopts unsightly discolouration from the flavouring component. This reminds the consumer that the instant beverage is distinct from the foamed beverages available at coffee shops or restaurants and lessens the beverage experience.

Chocolate beverages commonly derive their chocolate flavour from the presence of cocoa powder. Cocoa retains its characteristic brown colouration when dissolved in a liquid. Accordingly, when cocoa powder is included in an instant chocolate beverage composition it is entrained in and forms a part of any foam produced from creamer included therewith. In this way, the foam obtains an undesirable discoloration and detracts from the impression provided by the final beverage.

As an alternative, it is known to include chocolate in place of cocoa powder in a beverage in order to obtain a chocolaty flavour. However, chocolate has a low density (around 1.2 g/cm³) which means that it is readily entrained in the foaming creamer and discolours the foam. Furthermore, the high fat content of the chocolate destabilises a foam formed on top of such a beverage.

Accordingly, there is a desire for the provision of a chocolate beverage composition from which a chocolate beverage can be prepared that provides a white foam and/or which addresses at least some of the disadvantages associated with the prior art or provides a useful alternative for the consumer.

SUMMARY

According to a first aspect, the present disclosure provides a chocolate beverage composition comprising a foaming creamer and discrete cocoa solids, wherein substantially all of the cocoa solids are in a non-powdered form.

In a second aspect, the present disclosure provides a beverage made from the composition of the present disclosure.

In a third aspect the present disclosure provides a beverage dispensing container comprising the composition of the present disclosure.

In a further aspect the present disclosure provides a beverage dispensing system comprising a container according to the present disclosure and a beverage dispensing machine adapted to receive the container and to dispense a beverage therefrom by the addition of an aqueous beverage medium.

In a fifth aspect the present disclosure provides a method of forming a beverage comprising passing an aqueous beverage medium through the container according to the present disclosure.

In a sixth embodiment the present disclosure provides a method of preparing a beverage, the method comprising:
(i) providing a composition according to the present disclosure in a receptacle; and
(ii) introducing a drinkable fluid, preferably hot ater or milk, into the receptacle.

DETAILED DESCRIPTION

Figure 1A:
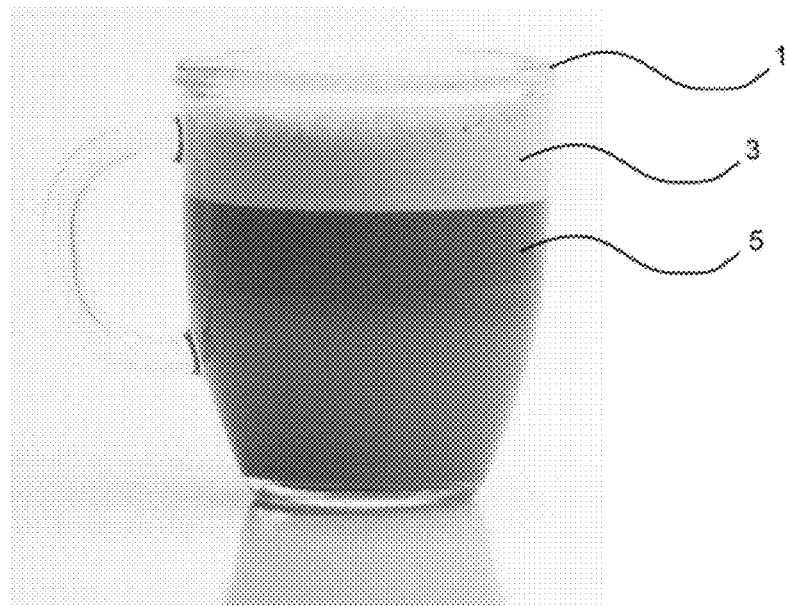
FIG. 1A shows a comparative foamed chocolate beverage having a discoloured foam.
Figure 1B:
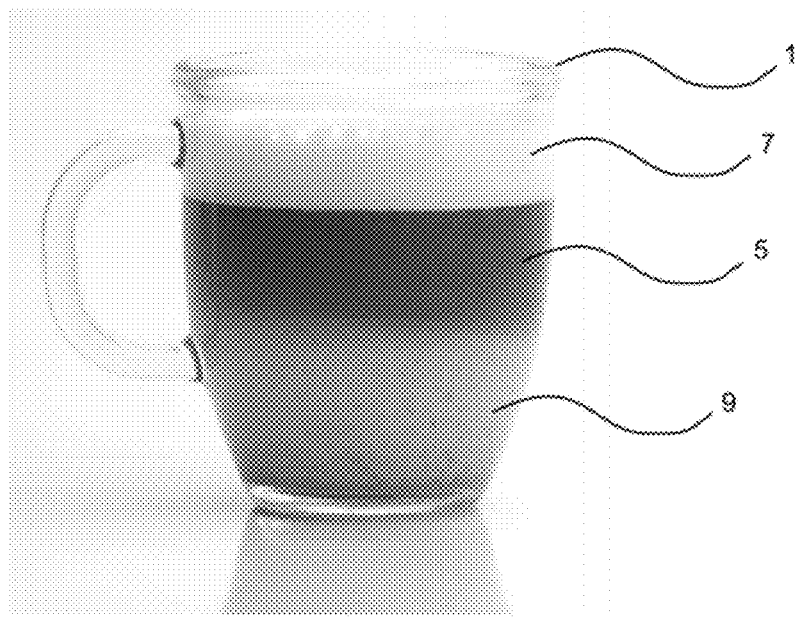
FIG. 1B shows a foamed chocolate beverage made according to the present disclosure having a white foam.
Figure 2A:
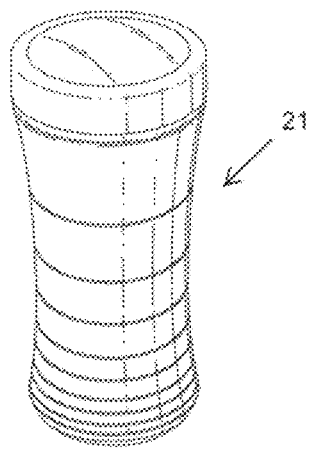
FIG. 2A shows a typical coffee package 21 for holding a composition as described herein, such as might be used for retail of a chocolate beverage product.
Figure 2B:
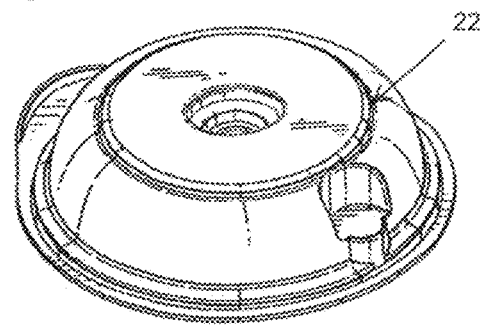
FIG. 2B shows a cartridge 22 suitable for holding the chocolate beverage composition and for use in a beverage producing machine 23.
Figure 2C:
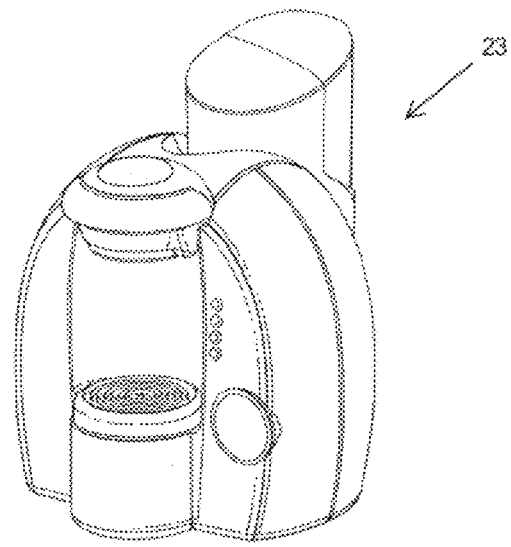
FIG. 2C shows a beverage producing machine 23 suitable for use with the cartridge 22 shown in FIG. 2B.

The present disclosure will now be further described. In the following passages different aspects of the disclosure are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The inventors have found that consumers prefer a white foam on a beverage, such as a chocolate cappuccino, rather than a foam that has the same colour as the bulk beverage or has patches of mottled colouring. The inventors have discovered that because the cocoa dissolves at the same time and in proximity to the foaming creamer an undesirable foam discoloration occurs.

The inventors have further discovered that by using a dense cocoa, preferably at least of greater density than water, in the foaming creamer/cocoa mixture, such as extruded cocoa or compacted cocoa powder, a white foam can be obtained. On mixing with water, the foaming creamer in the creamer/cocoa mixture dissolves quickly to form a white foam. At the same time, the dense cocoa sinks to the bottom of the beverage, where it dissolves more slowly, producing a chocolaty bulk beverage.

The composition of the present disclosure is preferably provided as a dry instant mix composition. The instant dry mix composition, upon reconstitution in a liquid (preferably a hot liquid), provides a beverage having a white foam on its surface, which has the appearance of an authentic beverage. The term "instant" as used herein refers to a product that readily dissolves or disperses in a liquid suitable for drinking, particularly hot water, hot milk or another hot beverage, such as coffee, (hot) chocolate or tea. Thus, an instant dry mix composition is one that can be made in a single step.

The term "white" foam as used herein refers to a foam white has substantially the same foam colour as is produced by foaming the foamer in the absence of any cocoa solids. That is typically a white or substantially white foam, in that the surface is essentially free of any comparatively darker coloured areas. Since the disclosure relates to a composition comprising cocoa solids any darker areas will generally be brown.

The term "substantially" as used in relation to the cocoa solids herein refers to the majority of the cocoa solids being provided in a non-powdered form. That is, the presence of loose cocoa powder is essentially minimised. It is preferred that the cocoa solids comprise less than 5% of cocoa powder, more preferably less than 2%, and most preferably less than 1% of the cocoa solids in the composition by weight of the cocoa solids.

The term "discrete" as used herein in relation to the creamer and the cocoa solids refers to these components being distinct from one another. This does not preclude the components being provided in contact with one another so long as the components are not entangled or adhered to each other to any significant degree so that the cocoa solids are not entrained into the foam and discolouration is avoided. In the context of this disclosure, the term indicates that on adding a fluid such as water to the composition, the creamer may fully dissolve without being hindered or prevented from dissolving by proximity to or the presence of the cocoa solids.

Cocoa solids are the non-fat component of chocolate. However, some amount of fat, preferably less than 15%, may be present in the cocoa solids used according to the present disclosure. Preferably the cocoa solids have less than 10% fat and may allow for the provision of an essentially fat-free beverage. Most preferably the cocoa solids have from 9 to 4% fat and more preferably from 8.5 to 5.5% fat. Using a lower fat content cocoa solids provides the further advantage that a higher density compressed form may be obtained. The cocoa solids are preferably dried before use, for example by vacuum drying.

All percentages herein are percentages by dry weight of the relevant component.

In the composition the cocoa solids are preferably present as discrete particles having a diameter of greater than 0.25 mm, more preferably from 0.5 mm to 7 mm, more preferably from 1 mm to 6 mm, more preferably from 1.5 mm to 4.5 mm, more preferably from 1.75 mm to 4.25 mm, and most preferably from 2 mm to 4 mm. The preferred diameter is about 3 mm. By "diameter" is meant the mean longest dimension across the particles. This can be measured by conventional am methods and it is intended that all or substantially all of the particles satisfy the dimension requirement. In particular, at least 70%, more preferably at least 85%, and most preferably at least 95% satisfy this dimension requirement. It is especially preferred that the particles include substantially no particles smaller than 0.5 mm since these are more likely to be entrained in the foaming creamer to result in undesirable discolouration. Preferably less than 5%, more preferably less than 2%, and most preferably less than 1% of the cocoa solids included in the composition have a diameter of less than 0.5 mm.

Cocoa powder, which is preferably to be minimised in the composition, is well known in the art. Cocoa powder is the unprocessed residue from removing the cocoa butter from cocoa. This typically has a very fine form of loose powder having an average (mean) particle diameter of less than 0.1 mm.

In order to avoid the presence of cocoa powder, it is therefore preferred that the discrete cocoa solids, which are substantially not in a powdered form, are provided particulated, granulated, tabletted, extruded, agglomerated, compacted, or a combination of two or more of these. The cocoa solids may also have undergone a further treatment step such as drying or sorting, for example, to remove powder. An preferred solid is extruded and then dried under vacuum.

In another embodiment, the cocoa powder may be provided in an expanded form. This form includes discrete expanded hollow structures of cocoa solids that are too big to be entrained in the foam. The form contains minimal loose cocoa powder and dissolves quickly due to its large surface area.

The cocoa solids are preferably provided in a compressed form such as a solid, tablet or extrudate form. In the latter case, the cocoa solids are preferably extruded with a sweetening agent, preferably a sugar as described herein, in a first step. When the sweetening agent is a sugar, such as glucose, the ratio of cocoa solids to sugar is preferably in the range of from 1:10 to 10:1. More preferably the ratio is in the range of from 1:2 to 2:1.

It is preferred that the cocoa solids are included in a compressed form, such as tabletted or extruded, so as to increase the density and, hence, reduce the dissolution rate when in water. Preferably the cocoa solids are compressed so as to have a greater density than water.

The compressed form preferably has a density in the range of from 1.5 g/cm$^3$ to 3 g/cm$^3$, more preferably in the range of from 2 g/cm$^3$ to 2.5 g/cm$^3$. By having a density greater than that of water (approximately 1 g/cm$^3$) the cocoa solids sink within the drinkable fluid used to make up a beverage and so are not entrained with the foaming creamer. As a consequence the inventors have found that the undesirable discolouration of the foam can be reduced or avoided.

The creamer used in the disclosure may be any conventional creamer that creates a significant amount of a stable, creamy foam layer which is similar to that of steamed milk foam. The creamer is preferably in powder form. Powdered creamers are well known in the art. The creamer may be dairy-based or non-dairy based or a combination thereof, and includes protein, lipid and fillers as essential components. To achieve the foaming effect, the creamer can include a source of gas to create the foam. This may be a simple incorporation of gas bubbles within the dry creamer which are released when dissolved in a hot liquid or it may involve the use alone, or additionally, of chemical carbonation to generate gas when the creamer is dispersed in a liquid. The creamer may be packaged and used as such or it may be dry-mixed with sweeteners, flavours, colours (e.g. whiteners) and other ingredients conventional in spray-dried powder creamers and in instant beverage compositions. Suitable gas-injected foaming creamers are disclosed in U.S. Pat. No. 4,438,147, U.S. Pat. No. 4,736,527 and U.S. Pat. No. 4,798,040. Suitable foaming creamers containing a carbonation system are disclosed in U.S. Pat. Nos. 5,721,003 and 5,780,092 and in published German Patent Application No. 4,407,361 A1 published on Sep. 7, 1995.

The composition may further include one of more of a sweetening agent, a flavouring agent, a thickener or a whitener. These are all conventional in the art. It is obviously preferable that any further inclusions in the composition do not have a colouring effect on the foam that could produce undesirable discolouration. Accordingly, any coloured additives should be included in minimal amounts or, if necessary, included in the compressed cocoa solids in order to minimise any discolouration of the foam.

A sweetening agent, if utilized, is present in an amount such that the beverage is appropriately sweetened. It may be used in addition to a sweetening agent used for extrusion of the cocoa, or the sweetening agent described here may be used for coextrusion. The amount of sweetening agent present in the composition is dependent on the type of sweetening agent as well as whether a sweetening agent is also present in the creamer. The sweetening component may be natural or artificial. Suitable natural sweetening agents include corn syrup solids or other sugar sweetening agents such as sucrose, fructose, lactose and maltose.

When it is desired to reduce or eliminate the sugar content of the formulation and incorporate one or more artificial sweetening agents, a bulking agent such as maltodextrin, polydextrine, lactose, and the like may be substituted for substantially the same amount of sugar. Moreover, the present disclosure also contemplates use of a component such as aspartame, cyclamate, acesulfam-K, or saccharin as the sweetening agent component.

Thickening agents, such as food grade gums, may also be employed to enhance mouthfeel of the composition when reconstituted in a hot liquid. The composition may further include thickening agents such as natural and synthetic gums and natural and chemically modified starches.

Flavouring agents are well known in the art for use in providing beverages with distinctive aromas and/or flavours. Examples include caramel, mint or coffee flavours and these may be provided by including a syrup or other flavouring in the composition. Preferably these flavourings are only present as secondary flavourings to the chocolate beverage. That is, the beverage remains a chocolate flavoured chocolate beverage having a secondary flavouring, rather than a beverage having a secondary chocolate flavour (such as in a cappuccino beverage). In a preferred embodiment, the beverage is simply a chocolate beverage.

In one embodiment, it is of course contemplated that the composition consists of the components recited in the claims and/or in combination with those indicated as preferable in the description.

In order to prepare a hot beverage from the dry mix composition, the foaming creamer and cocoa solids are combined in a cup with drinkable fluid, typically water or milk. The fluid is preferably a hot fluid. The mixture may be stirred until the creamer has dissolved and a foam layer results. The cocoa solids will also dissolve into the drink but, owing to their greater density, this takes place within, or substantially close to the bottom of the body of the drink. In this way the foam remains white and is not contaminated by the cocoa solids. Preferably the foaming creamer produces a foam without agitation beyond the introduction of the beverage fluid (or drinkable fluid) into a container.

The drinkable fluid is preferably water or milk and is preferably at a temperature of 50° C. or greater. That is, preferably from about 50° C. to about 100° C., for example from about 70° C. to about 95° C., such as about 85° C. This fluid, preferably an aqueous medium, may be heated to this temperature by a heater provided in a beverage dispenser or from a separate source such as a kettle.

A further flavoured fluid component may be added to the hot beverage. This means that the further flavoured component may be poured into the hot beverage after it has been made or, alternatively, the hot beverage may be poured into the further flavoured component. Suitable flavoured components include, for example, hot or cold coffee mixes. In this way a cappuccino drink may be prepared. Other flavoured components include (hot) chocolate and tea. Hot chocolate is preferred because, since it is added after the foam has formed it has minimal effect on the foam colour but, in combination with the composition of the present disclosure, a very chocolaty beverage can be prepared.

The density of the further flavoured component is preferably greater than that of the density of the foam layer, enabling the majority of the component to be propelled through the foam layer, or the foam layer preferentially remains above the flavoured component. Upon rapid stirring. i.e., 3-5 quick stirs, the further flavoured component disperses to form a finished drinkable beverage.

The further flavoured component is preferably at a temperature of 50° C. or greater. That is, preferably from about 50° C. to about 100° C., for example from about 70° C. to about 95° C., such as about 85° C. This component may be heated to this temperature by a heater provided in a beverage dispenser or from a separate source such as a kettle.

In a preferred embodiment of the disclosure, a flavouring used in the composition or, more preferably, a further flavoured fluid component which is used is instant coffee. Instant coffee is conventionally prepared by roasting and grinding coffee beans, extracting the roast and ground coffee with water to form an aqueous coffee extract, and then drying the extract, typically by spray- or freeze-drying. The coffee may be a single variety of coffee beans or a blend of several varieties. The coffee may further be decaffeinated. Any conventional method may also be utilized to agglomerate the coffee as described above.

In one embodiment the components of the composition are packaged in a multi-compartment system. In this case, the creamer is packaged by itself. The cocoa solids are packaged separately from the creamer. Preferably, however, the cocoa solids and the creamer are packaged together in, for example, a cartridge. A cartridge as described herein includes any kind of sachet, capsule, pod or container known in the art, including filter pods. This allows for simpler preparation and provision of the composition for preparing a chocolate beverage. The creamer and the cocoa solids, while packed together remain separate from the creamer in that the cocoa solids form discrete particles or bodies which do not include the creamer. That is, there is no intimate mixing of the creamer and the cocoa solids.

In a preferred embodiment, the cartridge is a sealed sachet of the beverage composition which can be opened and emptied into a cup or mug for preparation of a chocolate-containing beverage.

According to a further aspect of the present disclosure, there is provided a beverage dispensing cartridge comprising the beverage composition of the present disclosure. A beverage dispensing system typically consists of a beverage dispensing machine and a cartridge comprising a beverage composition. In use, the beverage composition is typically diluted with between 0.1 part and 10 parts by weight of an aqueous medium and the beverage is dispensed from the beverage dispensing system from an outlet into a cup or mug. The beverage may sometimes be further diluted with additional aqueous fluids, for example milk. Thus, beverage concentrates provide a convenient and efficient way of providing a consumer with a beverage.

It is preferred that the creamer and the cocoa solids are provided in the same compartment within the cartridge to allow for simpler cartridge design and use, This reduces the manufacturing costs and decreases the serving time required for preparing a beverage. As will be appreciated, the creamer and the cocoa solids are typically provided as a dry instant mix composition.

Suitable cartridges may be sealed and formed of substantially air- and water-impermeable materials. The cartridges may comprise an inlet for the introduction of an aqueous medium into the cartridge, an outlet downstream of the inlet for the discharge of a beverage from the cartridge and a flow path connecting the inlet to the outlet. By providing the beverage composition within the flow path connecting the inlet and outlet of the cartridge, for example within a chamber, the cartridges conveniently provide an integrated means for mixing the beverage composition with an aqueous fluid. In another embodiment the composition is simply provided in a single serving sachet or multi-serving container and introduced into a container by hand when preparing a drink.

According to the fourth aspect, there is provided a method of preparing a beverage, the method comprising:
(i) providing a composition of the disclosure in a receptacle, preferably a mug or cup; and
(ii) introducing a drinkable fluid, preferably hot water or milk, into the receptacle.

In one embodiment, the final beverage is prepared in the following steps:
(i) opening a sachet containing the composition of the present disclosure;
(ii) introducing the composition into a receptacle for the beverage;
(iii) part filling the receptacle with hot milk or water;

At this point the white foam forms on the surface and the dense cocoa solids settle to the bottom of the receptacle and dissolve slowly.
(iv) topping up the receptacle with hot coffee, (hot) chocolate or tea (or other hot beverage).

The hot beverage included in step (iv) may preferably be prepared by brewing a beverage from a cartridge in a beverage brewing machine, such as by using a coffee brewing pod. Such pods are well known in the art. The beverage is then ready for drinking. According to one preferred embodiment, a combined pack can be provided including a sachet or container of the composition of the present disclosure and a pod for brewing or preparing a hot beverage to be mixed therewith.

In an alternative less-preferred embodiment, step (iii) is omitted and the composition is foamed by the addition of the hot beverage.

A suitable beverage composition according to the present disclosure may comprise:

| | |
|---|---|
| Dairy or non-dairy foaming creamer | 10-14 g |
| Cocoa pieces | 2.0-6.0 g |
| Sugar | 2.0-4.0 g |
| Flavourings | 0.05-1.0 g |

The total composition weight is from about 15 g to about 25 g, most preferably about 20 g.

The disclosure is further illustrated with reference to the following examples and accompanying figures.

A chocolate-containing beverage was prepared from a composition comprising:

| | |
|---|---|
| Dairy or non-dairy foaming creamer | 11 g |
| Cocoa pieces | 2.0 g |
| | (mean diameter 3 mm) |
| Sugar | 2.5 g |
| Flavourings | 0.05 g |

A comparative composition (final beverage shown in FIG. 1A) was prepared from a composition comprising cocoa powder in place of the cocoa pieces. It was noted that since the composition of the present disclosure does not affect the colour of the foam, it would be possible to include twice as much cocoa in the beverage composition to result in a more chocolaty composition than that of the comparative example.

The compositions were placed in a glass mug 1. The composition was initially made up with hot water (80° C.), which formed a foam and dissolved the cocoa component, to form an intermediate beverage. The final beverage was formed by brewing a coffee beverage from a filter pod-machine into the intermediate beverage.

In the comparative beverage a discoloured foam 3 was formed on top of the bulk beverage 5. The bulk beverage 5 was substantially homogeneous soon after the beverage was formed since the cocoa powder dissolved quickly throughout the beverage. Some of the cocoa powder was entrained in the foam 3 which caused the discolouration.

In the beverage of the present disclosure, a clean white, non-discoloured foam 7 was formed on top of the bulk beverage 5. After a brief while, the bulk beverage 5 formed a two layer strata having a coffee layer close to the foam 7 and a chocolaty layer below it. Cocoa pieces 9 in the composition had sunk quickly to the bottom of the beverage and dissolved slowly throughout the bulk beverage 5. Eventually a homogeneous bulk beverage 5 was obtained and the non-discoloured foam 7 remained.

The invention claimed is:

1. A beverage dispensing container comprising:
a chocolate beverage composition including a dry mix of a foaming creamer and discrete cocoa solids, wherein at least about 95% of the discrete cocoa solids are in a non-powdered form and wherein the discrete cocoa solids have less than 15 wt. % fat and a density in the range of from 1.5 g/cm$^3$ to 3 g/cm$^3$;
the container being in the form of a cartridge containing the chocolate beverage composition, the container having an inlet for introduction of an aqueous medium and an outlet downstream of the inlet for discharge of the beverage.

2. A beverage dispensing container of claim 1, wherein the discrete cocoa solids are particulated, granulated, tabletted, extruded, agglomerated, compacted, or a combination of two or more of these.

3. A beverage dispensing container of claim 1, wherein the discrete cocoa solids are extruded cocoa solids.

4. A beverage dispensing container of claim 3, wherein the discrete cocoa solids are a coextrusion with a sweetening agent.

5. A beverage dispensing container of claim 4, wherein the ratio of discrete cocoa solids to sweetening agent is in the range of from 1:10 to 10:1.

6. A beverage dispensing container of claim 1, wherein the discrete cocoa solids are present as particles having a diameter of greater than 0.25 mm.

7. A beverage dispensing container of claim 6, wherein the discrete cocoa solids are present as particles having a diameter of from 1.5 mm to 4.5 mm.

8. A beverage dispensing container of claim 1, wherein the foaming creamer is a dairy based creamer.

9. A beverage dispensing container of claim 1, wherein the foaming creamer is a non-dairy based creamer.

10. A beverage dispensing container of claim 1, wherein the beverage further comprises one of more of a sweetening agent, a flavouring agent, a thickener or a whitener.

11. A beverage prepared by dissolving the chocolate beverage composition of claim 1 using a drinkable fluid.

12. A beverage of claim 11, wherein the drinkable fluid is water or milk and is at a temperature of 50° C. or greater.

13. A beverage of claim 11, wherein the beverage is mixed with a further liquid beverage before serving.

14. A beverage dispensing system comprising a container of claim 1 and a beverage dispensing machine adapted to receive the container and to dispense a beverage therefrom by the addition of an aqueous beverage medium.

15. A method of forming a beverage comprising passing an aqueous beverage medium through the container of claim 1.

16. A beverage dispensing container of claim 1, wherein the discrete cocoa solids do not contaminate a white foam that is produced when the chocolate beverage composition is reconstituted with a liquid.

17. A chocolate beverage composition comprising a dry mix of a foaming creamer and discrete cocoa solids, wherein at least about 95% of the discrete cocoa solids are in a non-powdered form and wherein the discrete cocoa solids have less than 15 wt. % fat, the dry mix forming a white foam when the chocolate beverage composition is reconstituted with a liquid, wherein the discrete cocoa solids are present as particles having a diameter of greater than 0.25 mm and a density in the range of from 1.5 $g/cm^3$ to 3 $g/cm^3$ such that the discrete cocoa solids settle substantially close to a bottom of a receptacle when reconstituted with the liquid so as not to contaminate the white foam.

18. A beverage dispensing container comprising the chocolate beverage of claim 17, the container being in the form of a cartridge, sachet, pod or capsule and containing the chocolate beverage composition, the container having an inlet for introduction of an aqueous medium and an outlet downstream of the inlet for discharge of the beverage.

19. The chocolate beverage composition of claim 17 wherein the discrete cocoa solids are present as particles having a diameter of about 2 mm to about 4 mm.

20. The chocolate beverage composition of claim 17 wherein the discrete cocoa solids are particulated, granulated, tabletted, extruded, agglomerated, compacted, or a combination of two or more of these.

* * * * *